US008285761B2

(12) United States Patent
Gupta et al.

(10) Patent No.: US 8,285,761 B2
(45) Date of Patent: Oct. 9, 2012

(54) AGGREGATION OF METADATA ASSOCIATED WITH DIGITAL MEDIA FILES

(75) Inventors: Amit Gupta, Bellevue, WA (US); Jeffrey V. Johnson, Woodinville, WA (US); Mala Munisamy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 11/925,112

(22) Filed: Oct. 26, 2007

(65) Prior Publication Data

US 2009/0112831 A1 Apr. 30, 2009

(51) Int. Cl.
*G06F 7/00* (2006.01)
*G06F 17/30* (2006.01)
(52) U.S. Cl. ........................... 707/825; 707/770
(58) Field of Classification Search .................. 707/101, 707/102, 104.1, 825, 770
See application file for complete search history.

(56) References Cited

U.S. PATENT DOCUMENTS

| | | | |
|---|---|---|---|
| 6,438,579 B1 | 8/2002 | Hosken | |
| 6,760,721 B1* | 7/2004 | Chasen et al. | 707/3 |
| 7,707,221 B1* | 4/2010 | Dunning et al. | 707/770 |
| 2003/0135513 A1* | 7/2003 | Quinn et al. | 707/102 |
| 2003/0234812 A1 | 12/2003 | Drucker et al. | |
| 2004/0002993 A1* | 1/2004 | Toussaint et al. | 707/104.1 |
| 2005/0131918 A1 | 6/2005 | Hillis | |
| 2006/0149681 A1 | 7/2006 | Meisner | |
| 2006/0212444 A1* | 9/2006 | Handman et al. | 707/5 |
| 2006/0248013 A1* | 11/2006 | Ebert et al. | 705/51 |
| 2009/0063496 A1* | 3/2009 | Cunningham et al. | 707/10 |

OTHER PUBLICATIONS

Francos Deliege and Torben Bach Pedersen, Aalborg University, Dept. of Computer Science, "Fuzzy Song Sets for Music Warehouses" http://www.cs.aau.dk/~fdeliege/doc/fd-07-02.pdf.
Mu Xia, Yun Huang, Wenjing Duan, Andrew B. Whinston, "Voice of the Crowd: Ballot Box Communication in Online Communities" http://www.business.uiuc.edu/mxia/apers/voice_of_the_crowd.pdf.
"Nice music review aggregation site" http://www.last.fm/user/LANjackal/journal/2006/12/8/285474/.
Francois Delege, Supervised by Torben Bach Pedersen, Aalborg University, Denmark, Dept. of Computer Science, "Foundations of Music Warehouses for Discovering New Songs I like" http://arvo.ifi.uzh.ch/dbtg/vldbphd2007/Camera-Ready%20Papers/Paper%204/phdvldb-camera2.pdf.

* cited by examiner

*Primary Examiner* — Apu Mofiz
*Assistant Examiner* — Chelcie Daye
(74) *Attorney, Agent, or Firm* — Shook, Hardy & Bacon LLP (57) ABSTRACT

Systems and methods for aggregating user feedback associated with digital media files is provided. User feedback is received from a user that includes metadata which may correspond to a digital media file. A batch of such user feedback is received and may be filtered to discard any low quality user feedback entries. It then may be determined whether a user feedback entry corresponds to an existing metadata record stored as aggregated feedback. If not, the new user feedback entry is added to the aggregated feedback. If there is an existing metadata record which corresponds to the user feedback entry, the metadata contained in the entry may be used to edit the existing metadata record.

20 Claims, 5 Drawing Sheets

AGGREGATION OF METADATA ASSOCIATED WITH DIGITAL MEDIA FILES

BACKGROUND

In media player programs, when a user accesses a digital media file, information about the file may be provided to the user to improve the user's experience. Such information may be in the form of a metadata record. Often metadata associated with a digital media file is licensed information provided to the media player program. However, metadata is not always available for every digital media file or the existing metadata may be incomplete or of a low quality; thus, feedback from the user may be used to supplement this metadata.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention relate to systems and methods for aggregating user feedback of metadata. User feedback is received from a user that includes metadata which may correspond to a digital media file. A batch of such user feedback is received and may be filtered to discard any low quality user feedback entries. It then may be determined whether a user feedback entry corresponds to an existing metadata record stored as aggregated feedback. If not, the new user feedback entry is added to the aggregated feedback. If there is an existing metadata record which corresponds to the user feedback entry, the metadata contained in the entry may be used to edit the existing metadata record.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems and methods for aggregating user feedback of metadata. User feedback is received from a user that includes metadata that may correspond to a digital media file. A batch of such user feedback is received and may be filtered to discard any low quality user feedback entries. It then may be determined whether a user feedback entry corresponds to an existing metadata record stored as aggregated feedback. If not, the new user feedback entry is added to the aggregated feedback. If there is an existing metadata record which corresponds to the user feedback entry, the metadata contained in the entry may be used to edit the existing metadata record by aggregating all existing feedbacks.

Having briefly described an overview of embodiments of the present invention, an exemplary operating environment suitable for use in implementing embodiments of the present invention is described below.

Figure 1:
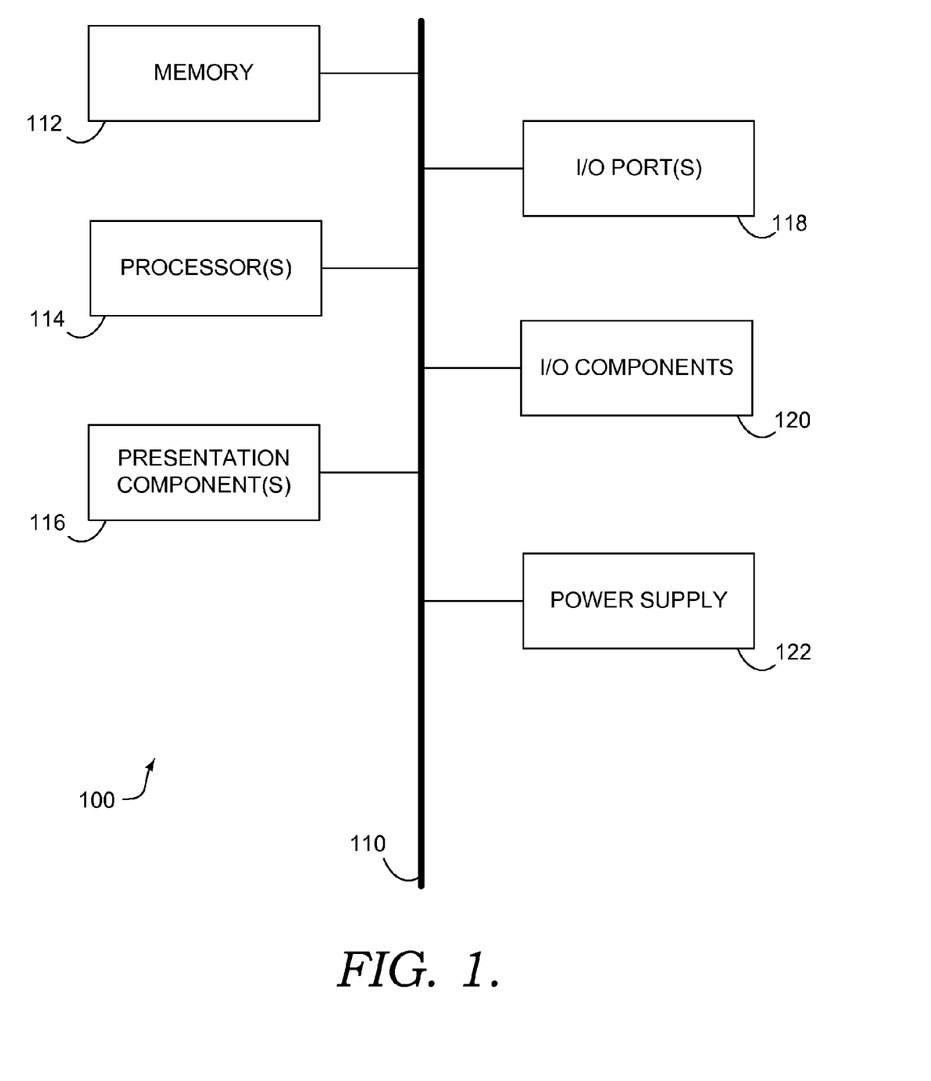
FIG. 1 is a block diagram of an exemplary computing system environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CD-ROM, digital versatile discs (DVD) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disk drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
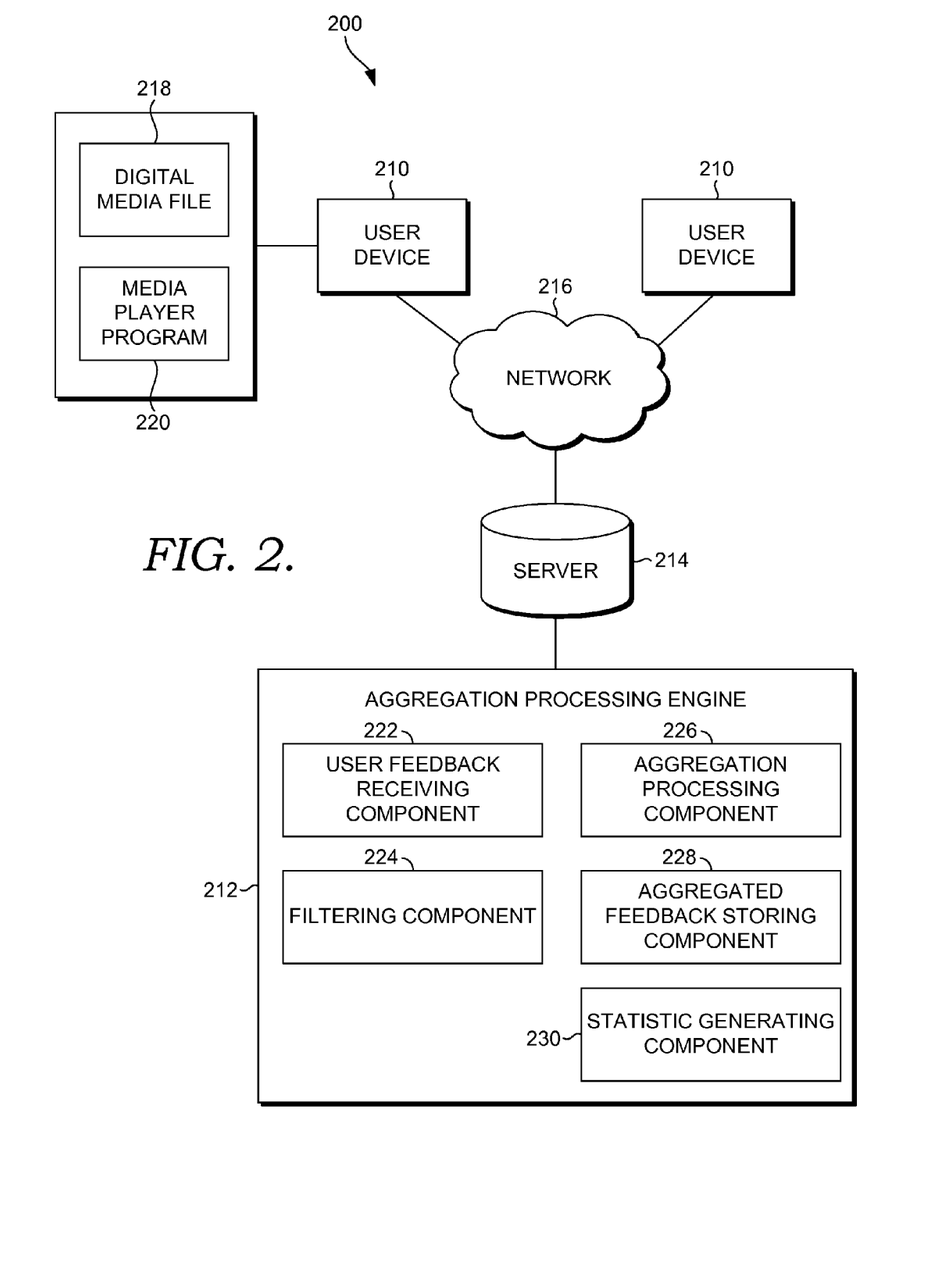
FIG. 2 is a block diagram illustrating an exemplary system for aggregating user feedback, in accordance with an embodiment of the invention.

Turning now to FIG. 2, a block diagram is illustrated that shows an exemplary computing system 200 configured to aggregate user feedback, in accordance with an embodiment of the present invention. It will be understood and appreciated by those of ordinary skill in the art that the computing system 200 shown in FIG. 2 is merely an example of one suitable computing environment and is not intended to suggest any limitation as to the scope of use or functionality of the present invention. Neither should the computing system 200 be interpreted as having any dependency or requirement related to any single component/module or combination of components/modules illustrated herein.

Computing system 200 includes one or more user devices 210 and a server 214, all in communication with one another via a network 216. The server 214 includes an aggregation processing engine 212. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The server 214 may be configured to aggregate information or metadata from user feedback, as more fully described below. It will be understood and appreciated by those of ordinary skill in the art that the information stored in the server 214 may be configurable and may include any information relevant to metadata records that may be aggregated. Further, though illustrated as a single, independent component, server 214 may, in fact, be a plurality of servers, portions of which may reside on a computing device associated with the aggregation processing engine 212, the user device 210, and/or any combination thereof.

Each of the aggregation processing engine 212 and the user device 210 shown in FIG. 2 may be any type of computing device, such as, for example, computing device 100 described above with reference to FIG. 1. By way of example only and not limitation, the aggregation processing engine 212 and/or the user device 210 may be a personal computer, desktop computer, laptop computer, handheld device, mobile handset, consumer electronic device, and the like. It should be noted, however, that the present invention is not limited to implementation on such computing devices, but may be implemented on any of a variety of different types of computing devices within the scope of the embodiments hereof.

Referring further to FIG. 2, the user device 210 accesses a digital media file 218, such as one residing on a compact disc (CD) or other suitable computer storage media. Digital media files may include text, images, audio content, video content, and any combinations thereof. User device 210 also executes a media player application program 220. The media player program 220 may be any suitable media player that is configured to play digital media so that a user can experience the content that is embodied on the media. For example, suitable media player applications may include a CD media player application and a DVD media player application. While in this invention metadata corresponds to a digital media file, this invention could be applied to other types of files beyond media files, as well as hardware devices.

Embodiments of the present invention enable the user or, particularly, enable media player program 220 executed on user device 210, to access, retrieve, and display for the user, metadata. Those skilled in the art will understand and appreciate that metadata is simply information about data. In the context of the present invention, metadata includes information related to specific content of digital media file 218. Basic metadata includes title, composer, performer, genre, description of content, and the like. Extended metadata includes cover art, performer biographies, reviews, related performers, where to buy similar items, upcoming concerts, ticket sales, URLs to other related experiences including purchase opportunities, and the like. For visual media such as photographs, metadata may include title, date picture was taken, photographer, etc.

In FIG. 2, server 214 matches the metadata stored therein to the specific media content that is being experienced by the user. Server 214 then returns the metadata to the user device 210. In the examples herein, the media content of digital media file 218 is described in the context of content embodied on a CD or a DVD. It will be appreciated and understood that the media content can be embodied on any suitable media, including digital files downloaded to the user device 210, and that the specific examples described herein are given to further understanding of the inventive principles. For convenience, digital media file 218 refers to one or more files representing, for example, a single song track or a collection of tracks such as would be found on an audio CD. The media content can include, without limitation, specially encoded media content in the form of, for example, an encoded media file such as media content encoded in Microsoft® Windows Media™ format using the Microsoft® Windows Media Player™ program.

Various features of the described systems and methods include a set of databases, client side executable code, and a series of server side processes that provide for querying and maintaining the databases. One logical organization of exemplary system 200 includes a process to map a piece of physical media (embodied by digital media file 218) to a unique database key or, as referred to herein, a "physical ID." This organization also includes a query process to retrieve information from server 214 based on the unique database key or physical ID. Various components, such as for example user feedback receiving component 222 and aggregated feedback storing component 228 (described more fully below), allow users to contribute to the set of understood keys or physical IDs. The logical organization of system 200 also includes a set of management processes that handle user contributions, such as user-provided feedback or data entries.

The system 200 permits the user to play media file 218 on an enabled media playing device (e.g., user device 210 running Microsoft® Windows® operating system and Windows Media Player™) and expect not only to experience the media content, but also have access to all manner of related metadata. In addition, the user community has the ability to contribute key information to the process to improve the experience for other users.

In system 200, the user inserts the media into user device 210, or otherwise causes the content of media file 218 to be experienced. User device 210 uses a textual entry identifying specific media file 218 to access the physical ID that uniquely identifies the media. Server 214 then uses the physical ID as the basis for metadata queries. These queries are designed to retrieve a rich set of related metadata for the user. Server 214 then returns the metadata to user device 210 via network 216 for display to user, as will be described more fully below.

When the user accesses an audio track from a specific digital medium, the track (i.e., digital media file 218) is stored on local storage media associated with the user's computer, such as user device 210 in FIG. 2. If user device 210 is connected to network 216, media player program 220 executing on user device 210 sends an identifier for digital media file 218 to server 214. As described above, the identifier may take the form of a physical ID identifying the specific digital media file 218 based on the offsets of each track on the disc.

By way of example, without limitation, where the media comprises a CD, a physical ID may be a table of contents (TOC). The TOC, defined by a well-known specification referred to as the Red Book, identifies an audio CD based on absolute times for the start of each track. The TOC, found in the CD's lead-in area, is expected to be the same for all like-entitled CDs published from the same source. In response to the received TOC, server 214 transmits metadata associated with the identified media file 218 to the user device 210. The software code can read the offsets (in frames, which have a resolution of $1/72^{nd}$ of a second) of each track on the disc. A composite key or physical ID is then built from a string of the hex values of these offsets, prefaced by a number of tracks on the disc and finished with a representation of the total length of the disc.

In the case where the media comprises a DVD, the software code can read the first 64 kilobytes of two files that are on every DVD. These files are VIDEO_TS.IFO and VTS_01_0.IFO. The former contains main-menu information (VMGI), and the latter contains title set information (VTSI) for the first title on the DVD. After the appropriate data blocks are read, the code generates a unique key or physical ID, which for a DVD is a 64-bit CRC (cyclic redundancy code) checksum of the data.

Of course, it is to be understood that the two examples of a CD and DVD are simply two ways that a physical ID can be generated for two different types of media. Other methods of generating physical IDs, as well as other media types may be employed.

As shown in FIG. 2, the aggregation processing engine 212 includes a user feedback receiving component 222, a filtering component 224, an aggregation processing component 226, an aggregated feedback storing component 228, and a statistic generating component 230. In some embodiments, one or more of the illustrated components 222, 224, 226, 228, and 230 may be implemented as stand-alone applications. In other embodiments, one or more of the illustrated components 222, 224, 226, 228, and 230 may be integrated directly into the operating system of the aggregation processing engine 212 or the user device 210. In the instance of multiple servers, embodiments of the present invention contemplate providing a load balancer to federate incoming user feedback to the servers. It will be understood by those of ordinary skill in the art that the components 222, 224, 226, 228, and 230 illustrated in FIG. 2 are exemplary in nature and in number and should not be construed as limiting. Any number of components may be employed to achieve the desired functionality within the scope of the embodiments of the present invention.

The user feedback receiving component 222 is configured for receiving user feedback (e.g., from user device 210 in FIG. 2). The user feedback is entered on the client side from a user and, by way of example only, may be compiled on a user interface for the user to enter metadata. Such a user interface may be manually selected by the user when the user wants to send metadata related to a digital media file, or such a user interface may automatically open, for example on the user device 210, when the metadata of a digital media file stored on server 214 is inadequate or of low quality. Once the user has entered the user feedback, the user feedback is sent to server 214, for example via network 216.

In embodiments of the present invention, the user feedback received by the user feedback receiving component 222 is processed in a batch. As referred to herein, a batch of user feedback includes user feedback entries received since the last time the user feedback entries were filtered and/or processed by, for example, the filtering component 224 and the aggregation processing component 226, respectively. Because user feedback entries may be processed based on whether they are matching, adding, or editing metadata records (as will be described below), a batch of user feedback entries may be received for each group. For example, user feedback entries corresponding to matching metadata records may be received in one batch, and user feedback entries corresponding to adding metadata records may be received in a separate batch. In embodiments of the present invention, a batch is received a least once per day, but one skilled in the art will appreciate that this frequency may be configured as necessary. The more frequent a batch can be received, filtered, and/or processed, the better an experience the user will receive because the user will receive the most up-to-date and accurate aggregated metadata, especially when a new album is released and no provider metadata has been received yet.

The filtering component 224 is configured for filtering low quality user feedback from the aggregation process. In embodiments of the present invention, the filtering component 224 employs two sets of rules to filter user feedback entries: relaxed business rules and strict business rules. The filtering component 224 allows high quality user feedback entries to enter the aggregation process with the possibility of being aggregated, and may also allow user feedback entries of very high quality to be sent to a real time database. From the real time database, the user feedback entry may be made available to send to the user, bypassing further processing (e.g. by the aggregation processing component 226). One skilled in the art will understand and appreciate that the determination of quality, based on a predetermined threshold, may vary and may be configured as necessary.

The aggregation processing component 226 is configured for aggregating user feedback entries. More specifically, the aggregation processing component 226 receives a batch of user feedback entries, determines whether the metadata already exists in the aggregated feedback, and either adds the user feedback to the aggregated feedback or edits the existing aggregated feedback using the newly received user feedback. Additionally, different users may enter feedback associated with a digital media file differently from another user, and only partial data from each feedback may be correct. To avoid duplicate metadata records, the aggregation processing component 226 can flexibly aggregate such differing user feedback into one metadata record.

The aggregated feedback storing component 228 is configured for storing the aggregated feedback, such as the feedback aggregated by the aggregating component 228. This component may also store specific lists of aggregated feedback, such as a list of known good artists or popular artists. This aggregated feedback may then be displayed back to the user, for example, by the user device 210. The aggregated feedback may be presented by various methods, such as via a computer monitor, television screen, touch screen, personal digital assistant, mobile telephone display and the like.

Further, the aggregated feedback storing component 228 may include metadata provided by a known data provider. Such metadata is hereinafter referred to as "provider data." Typically, known data providers (e.g., AMG and CD Journal) supply the storing component with trusted information, such as metadata associated with digital media files. In this instance, data providers specialize in the gathering and management of media metadata and license the data to the system 200. However, if it is determined that the provider data is of a low quality or is an incomplete metadata record, embodiments of the present invention allow users, via user feedback, to edit the stored provider data entry, which may improve the quality of or complete the provider data. If the provider data is of a high quality, the data is treated as canonical and the system 200 will not allow user feedback to edit the provider data.

The statistic generating component 230 is configured for generating statistics regarding the aggregated feedback stored in the storing component 228. The storing component 228 may, for example, use the number of edits performed and the popularity of an existing metadata record to determine an album's stability. Once a determined first level of stability is reached for an entity, no more feedback entries may be processed for it, until the stability falls below a determined second level. Preferably, the second level will be below the first level, although one skilled in the art will understand and appreciate that these levels may be configured as necessary.

Figure 3:
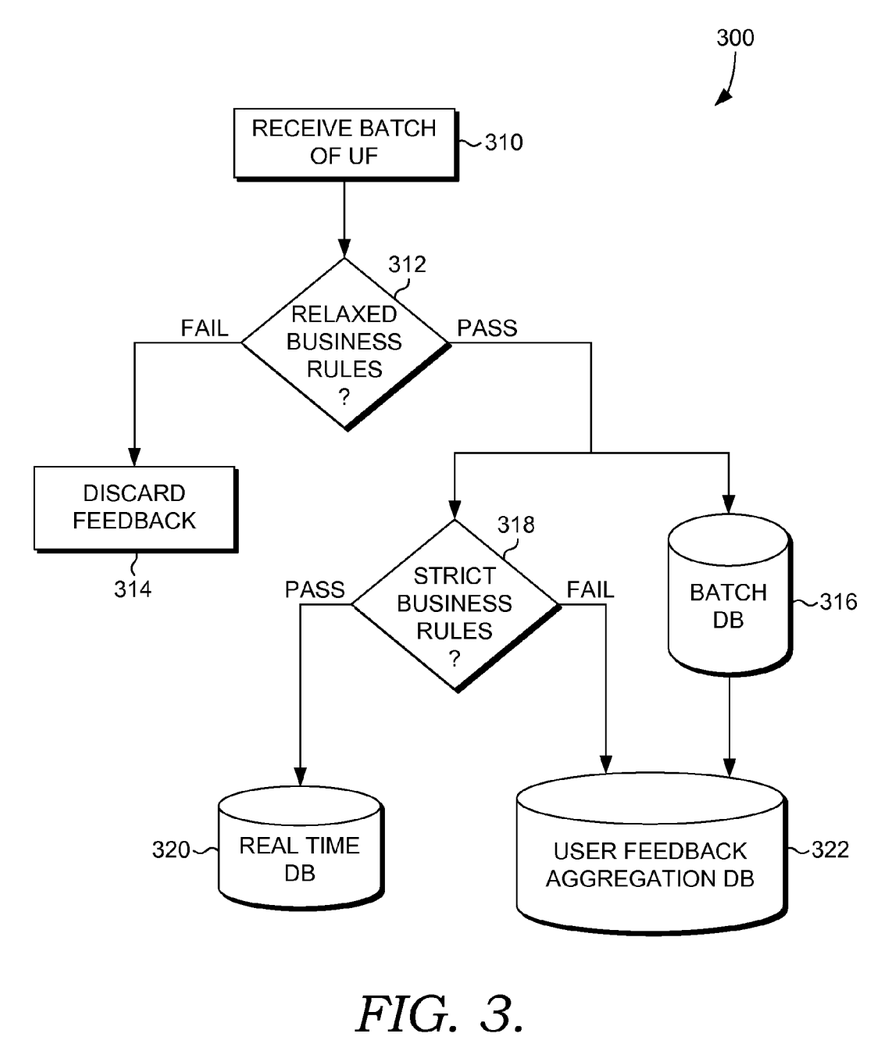
FIG. 3 is a flow diagram illustrating an exemplary method for filtering user feedback, in accordance with an embodiment of the present invention.

FIG. 3 is a flow diagram illustrating an embodiment in accordance with the present invention. More specifically, FIG. 3 illustrates a method for filtering user feedback based on quality of the feedback. At block 310, a batch of user feedback is received. At 312, each user feedback entry undergoes the relaxed business rules, which will be described more fully in regards to FIG. 4. If the feedback fails, the user feedback entry is discarded at 314. If the user feedback passes the relaxed business rules, the user feedback is sent to the batch database at 316 for batch processing. The user feedback is further analyzed under the strict business rules at 318. The strict business rules, as referred to herein, are further described in relation to FIG. 4. If the user feedback does not pass block 318, the user feedback is sent to the user feedback aggregation database 322 for aggregation processing (e.g., by aggregation processing component 226 in FIG. 2). If the user feedback passes the strict business rules, the user feedback may be sent to a real time database which allows for the user feedback to be made available to the user, bypassing the aggregation process.

Figure 4:
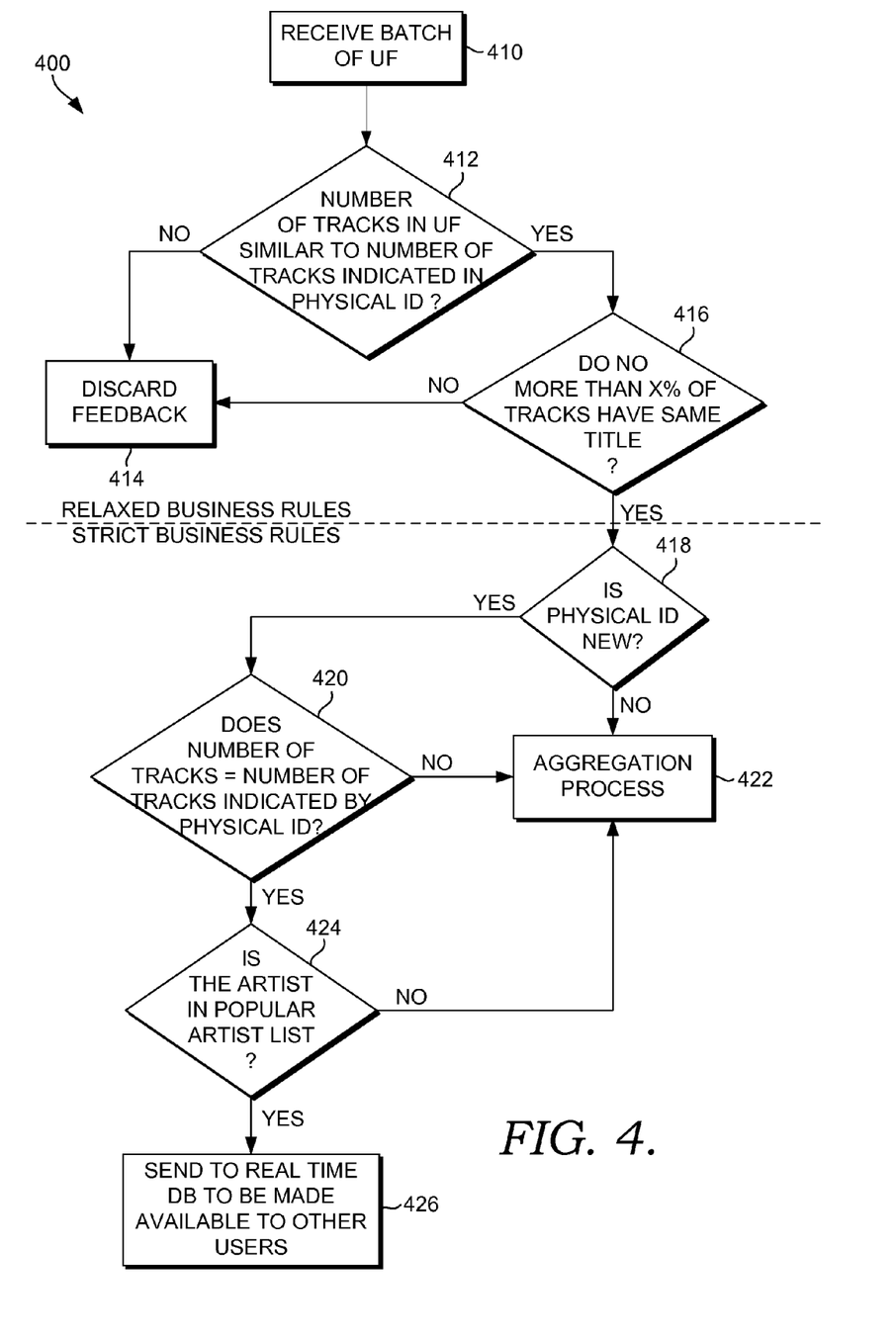
FIG. 4 is a flow diagram further illustrating a method for filtering user feedback, in accordance with an embodiment of the present invention.

FIG. 4 is a flow diagram illustrating an embodiment in accordance with the present invention. FIG. 4 illustrates a method for filtering user feedback entries prior to the aggregation process. This method would occur, for example, in the filtering component 226 of FIG. 2. Further, this method encompasses the relaxed business rules 312 and the strict business rules 318 referenced in FIG. 3, as is noted on the figure. The process begins at step 410 when a batch of user feedback entries is received. Each entry may include a physical ID entry (here, a TOC entry) and a textual entry. The textual entry may include metadata entered by the user. An entry is examined to determine how many tracks are included in the user feedback entry and further how many tracks are indicated by the physical ID. When performing the analysis at step 412, a pre-determined level of tolerance is configured, which may vary based on the number of tracks. For example, the greater the number of tracks the higher the tolerance level will be. By way of example, without limitation, if there is one track, the tolerance would be zero. In other words, the user feedback will pass step 412 only if there is one track in the user feedback and one track indicated by the TOC. If there are two to four tracks indicated by the TOC, the tolerance level is one, and if there are five or more tracks indicated by the TOC, the tolerance level is two. One skilled in the art will understand and appreciate that the tolerance level described herein may vary from the examples given and may be configured as necessary.

If the number of tracks does not fall within the predetermined tolerance level, the user feedback is discarded at 414. If the user feedback does fall within the tolerance level, the user feedback proceeds onto step 416 in FIG. 4. At step 416, the user feedback will pass on if no more than a set percentage of the tracks have the same title. This is also configurable based upon the number of tracks represented by the albums. So, by way of example and not limitation, for one to four tracks, all tracks should be unique, and for five or more tracks, at least half of the tracks should be unique to pass 416. If the user feedback does not pass step 416, the feedback is discarded at step 414. At this point in FIG. 4, steps 410 to 416 encompass the relaxed business rules, as referred to in FIG. 3.

Subsequently at step 418, the strict business rules are applied. At step 418, the TOC of the user feedback is analyzed to determine whether the physical ID is new or whether it is associated with a physical ID in the aggregated feedback list. If the physical ID is not new, the user feedback is sent on to the aggregation process at step 422. If the physical ID is determined to be new, the user feedback is further analyzed to determine whether the number of tracks is equal to the number of tracks indicated by the physical ID. This is similar to step 412 described above, but in step 420, there is no tolerance level. The number of tracks must be equal to pass, otherwise, the user feedback entry is sent on to the aggregation process at 422. If the tracks are equal, it is then determined whether the artist is in the popular artist list. Such a popular artist list would be stored, for example, by the aggregated feedback storing component 228. If the artist in the user feedback entry is an exact match of a popular artist, the user feedback has passed the strict business rules, and is sent to a real time database at 426 to be made available to send to the user (e.g., by sending the user feedback to the real time database 320 in FIG. 3). If the user feedback does not pass step 424, the user feedback entry is sent to the aggregation process at 422.

Figure 5:
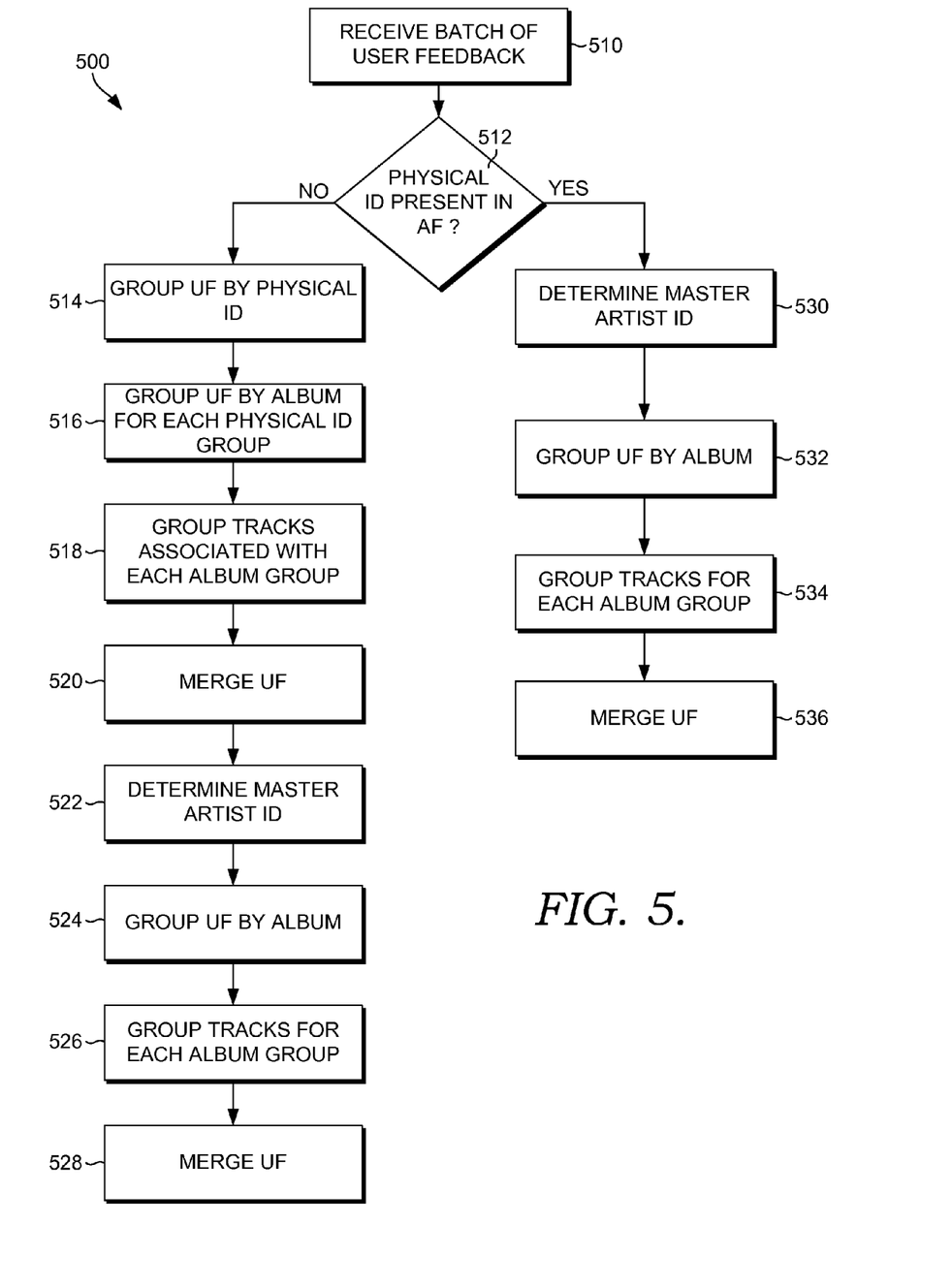
FIG. 5 is a flow diagram illustrating an exemplary method for aggregating user feedback, in accordance with an embodiment of the present invention.

FIG. 5 is a flow diagram illustrating an embodiment in accordance with the present invention. In step 510, a batch of user feedback is received, such as, for example, the user feedback received by the user feedback aggregation database 322 in FIG. 3. Any feedback that is editing provider data is separated from the user feedback batch and sent to a different database for processing (not shown). At step 512, the physical ID of each user feedback entry is examined to determine whether the physical ID is present in the aggregated feedback. If it is determined that the physical ID of a user feedback is not present in the aggregated feedback, the user feedback will be added to the aggregated feedback. New user feedback to be added is then grouped by physical ID in step 514, fuzzy grouping or matching is used to assign the best textual entries for the album. Fuzzy grouping or fuzzy matching allows for matching of similar user feedback to occur without exact matching. This will be described more fully below and provides a way to use the best metadata from individual feedback to create a master record of album metadata. By not requiring exact matches of metadata, more user feedback may be merged which results in fewer duplicate album entries and thus a more enjoyable user experience.

Once the user feedback is grouped by album in step 516, fuzzy grouping is again used to group the tracks associated with each album group, as set forth in step 518. At step 520, the user feedback in the batch with the same physical IDs are merged. The best textual entries are merged and assigned a single ID. At step 522, a master artist ID is determined by first identifying whether the artist in the user feedback is listed in a known good artist list. If so, the master artist ID associated with the artist is used for the new user feedback. If not, the artist is compared to all other artists listed in the aggregated feedback using fuzzy matching. If the artist is identified in this list, the master artist ID associated with the listed artist is used for the new user feedback. For user feedback containing a new artist, fuzzy grouping is then used to group all user feedback in the batch by artist. These artist groupings are then used to assign a single master ID to the new artist.

The batch of user feedback is further limited in step 524 by grouping the user feedback with similar album title and artist, and then using fuzzy grouping to identify similar tracks and group the tracks within each album group. Once grouped, if the tracks are more similar than a threshold percentage, those user feedbacks with similar tracks are merged. For example, the threshold percentage may be from 50% to 75%. When the feedback is merged, the most popular ID is chosen as the master ID. All other IDs may be kept in a mapping table. So, if the IDs are cached on the client side (e.g., by user device 210 in FIG. 2), the user can still access updated aggregated feedback with the help of the mapping table. The user may be notified when updates have occurred, so that they may access the aggregated feedback.

As an additional step, feedback on already existing albums is identified by searching based upon the album title and artist. If the similar album title is found in the aggregated feedback, then the tracks are grouped using fuzzy grouping. If the tracks of the new feedback are similar within a certain threshold percentage to the tracks in the already aggregated feedback, the new feedback is considered to be "edit feedback" and is further processed accordingly, as described below.

If at step 512, the physical ID of the user feedback is determined to be present in the aggregated feedback or it is explicitly marked as edit feedback, the user feedback is considered "edit feedback" and proceeds to step 530. All edit feedback is gathered with the original metadata that matches the physical ID of the new user feedback. At step 530, a master artist ID is determined from this group of feedback by first looking up the artist in the list of known good artists using the fuzzy lookup method. Then, if the artist is not a known good artist, the aggregated artist list is searched, using the fuzzy lookup method. If the artist is found in the known good artist list or the aggregated artist list, the known master artist ID is used. For all artists that are not found in either list, the feedback entries with the same artist (as determined by fuzzy grouping) in the batch are grouped and assigned a single master artist ID. The feedback entries are then updated using the newly determined master artist ID.

Next, at step 532, within the batch, all of the edit feedbacks of the same album are identified. Those with similar albums listed, as determined using fuzzy grouping, are grouped and the best textual entries are assigned. From these groups, fuzzy grouping is used to group the edit feedback entries by track. This identified group is also assigned the best textual entries, as will be more fully described below. Finally, at step 536, the edit feedback determined to be the same album is merged using the maximum occurring textual entries for all of the textual entries determined.

As mentioned above, provider data that exists in the metadata records may be edited by user feedback in embodiments of the present invention. Referring to FIG. 5, if the user feedback is identified as a provider data edit, the feedback will be separated at step 512 for separate processing. Before allowing provider data to be edited, the quality of the provider data will first be determined because the provider data will only be allowed to be edited if it comprises low quality data. Further, embodiments of the present invention may allow only certain attributes of the physical data to be edited.

Furthermore, the possibility exists for the physical ID of a user feedback entry corresponding to a digital media file to not match the physical ID of the metadata record of the same digital media file. If this occurs, the feedback entry will undergo match processing, which comprises mapping the new physical ID with the corresponding digital media file.

As discussed above, the present invention also employs aggregation techniques, which allow consideration of each part of user feedback information separately and which create a consolidated, master entry from multiple user feedback entries. Typically, when aggregating user feedback entries, only those entries that are an exact match will be aggregated. The example below, in contrast, illustrates an embodiment of the present invention that uses a "fuzzy" grouping or matching algorithm to achieve a master record that more accurately reflects an aggregated entry. In the following example, five users have provided a user feedback entry on a particular album.

TABLE 1

|  | USER 1 | USER 2 | USER 3 | USER 4 | USER 5 | USER 6 | USER 7 |
|---|---|---|---|---|---|---|---|
| Album Title | Summer | Sumer | Summer special | Summer | Summmer | Absolute | Nothing |
| Artist | Jelo | Jennifer Lopez | J-Lo |  | Jenifer Lopez | Jennifer Lopez | Jenifer Lopaz | Jennifer Lopez |
| Track 1 | I had a dream | I hav a dream | I haf a dream | Dream | I had a dream | Dream | Dream |

With regard to Track 1, typically the maximum occurring unique string would be chosen as representing the title of Track 1. Here, that would be "Dream," and thus, if the entries from Users 1-7 were aggregated, the title of Track 1 would be "Dream" in the metadata record. However, embodiments of the present invention use fuzzy grouping and matching, and accordingly, the process and result varies. First, the text entered by User 1, User 2, User 3, and User 5 is determined to be similar using fuzzy grouping, even though the entries of Users 2 and 3 contain typographical errors. Since, of these strings, the entry "I had a dream" is listed by the majority of the users, the text entered by Users 2 and 3 is corrected to match this entry. Then, the maximum occurring unique string is identified (e.g., "I had a dream") and is chosen for the canonical text for Track 1. Similar procedures and methods are used for other categories of metadata, such as album title, artist, etc.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all of the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer storage media having computer-executable instructions embodied thereon for performing a method of aggregating user feedback of metadata, the method comprising:
   maintaining a database of metadata records, the metadata records each corresponding to one or more media files;
   receiving a batch of user-provided data entries from one or more users, the data entries each corresponding to a specific media file;
   aggregating the user-provided data entries with differing user feedback into one metadata record;
   determining whether each data entry is of a predetermined quality, wherein determining whether each data entry is of a predetermined quality includes:
     (1) analyzing a user feedback entry that comprises a physical ID and a textual entry,
     (2) identifying a predetermined level of tolerance, wherein the predetermined level indicates an acceptable number of tracks for a received physical ID, and
     (3) determining the physical ID indicates at least the acceptable number of tracks, and because so, determining the user feedback complies with the predetermined level of tolerance;
   upon determining that a data entry is of the predetermined quality, aggregating the data entry with the database of metadata records,
   upon determining that the data entry is not of the predetermined quality, discarding the data entry;
   determining a popularity of the metadata record and a number of edits to the metadata record, the popularity comprising a value indicating a number of times the metadata record was used to verify stability of the one or more files; and
   using the popularity of the metadata record and the number of edits to the metadata record to generate statistics regarding the user-provided data entries and the differing user feedback.

2. The computer storage media of claim 1, wherein the data entries each comprise a physical ID entry and a textual entry.

3. The computer storage media of claim 2, wherein the physical ID entry comprises a table of contents (TOC) entry having one or more tracks associated therewith, and wherein the textual entry has one or more tracks associated therewith.

4. The computer storage media of claim 3, wherein each data entry is of a predetermined quality if the number of tracks associated with the TOC entry is within a predetermined threshold of the number of tracks associated with the textual entry.

5. The computer storage media of claim 3, wherein the tracks associated with the TOC entry each have a title associated therewith and wherein the tracks associated with the textual entry each have a title associated therewith.

6. The computer storage media of claim 3, wherein each data entry is of a predetermined quality if a predetermined amount of the titles associated with the TOC entry are identical to the titles associated with the textual entry.

7. The computer storage media of claim 5, wherein each data entry is of a predetermined quality if at least half of the titles associated with the TOC entry are identical to the titles associated with the textual entry.

8. The computer storage media of claim 5, wherein a data entry is of a predetermined quality if all of the titles associated with the TOC entry are identical to the titles associated with the textual entry.

9. The computer storage media of claim 1, wherein the method further comprises sending the data entry to a real time database if the data entry is determined to be of a predetermined quality.

10. A computer system embodied on at least one computer storage media having computer-executable instructions embodied thereon for performing a method of aggregating user feedback of metadata, wherein the system includes a database of metadata records stored therein corresponding to one or more media files, the system comprising:
    a receiving component configured for receiving a batch of one or more user-provided data entries, the data entries each corresponding to one or more media files;
    aggregating the user-provided data entries with differing user feedback into one metadata record;
    an aggregating component configured for aggregating each data entry with the database of metadata records if the data entry corresponds to a metadata record in the database, wherein the data entry and the metadata record are not identical, wherein the data entry corresponds to the metadata record in the database when a physical ID entry that comprises the data entry corresponds to a physical ID entry that comprises the metadata record;
    an aggregated feedback storing component configured for storing metadata provided by a known provider such that the metadata provided by the known provider is editable; and
    a statistical generating component configured for generating statistics about a media file based on a number of edits performed to the metadata records of the media file and a popularity of the media file, wherein the popularity comprises a value indicating a number of times the metadata records were used to verify stability of the one or more files; and wherein the generated statistics are regarding the user-provided data entries and the differing user feedback.

11. The computer system of claim 10, wherein the data entry comprises a physical ID entry and a textual entry associated therewith, and wherein the metadata record comprises the physical ID entry and a textual entry.

12. The computer system of claim 10, wherein the filtering component is configured to filter the batch of data entries based on quality of each data entry.

13. The computer system of claim 10, wherein the a storage component is further configured to store a database of metadata records, the metadata records each corresponding to one or more media files.

14. The computer system of claim 10, further comprising a statistic generating component configured to generate statistics based on the stability of each metadata record.

15. One or more computer storage media having computer-executable instructions embodied thereon for performing a method of aggregating user feedback of metadata, the method comprising:

maintaining a database of metadata records, the metadata records each corresponding to one or more media files, wherein the metadata records each comprise a physical ID entry and a textual entry, and wherein the metadata records include editable metadata provided by a known provider;

receiving a batch of user-provided data entries from one or more users, the data entries each corresponding to a specific media file, wherein the data entries each comprise a physical ID entry and a textual entry;

aggregating the user-provided data entries with differing user feedback into one metadata record;

determining that the physical ID entry of each data entry corresponds to a physical ID entry of a metadata record;

based on a number of tracks indicated by the physical ID, determining compliance with a pre-determined level of tolerance that is based on how many tracks are indicated by one or more physical IDs;

aggregating the corresponding data entry and metadata record by editing the corresponding metadata record;

determining a popularity of the metadata record and a number of edits to the metadata record, the popularity comprising a value indicating a number of times the metadata record was used to verify stability of the one or more files; and     using the popularity of the metadata record and the number of edits to the metadata record to generate statistics regarding the user-provided data entries and the differing user feedback.

16. The computer storage media of claim 15, wherein the method further comprises aggregating one or more data entries having a corresponding physical ID entry.

17. The computer storage media of claim 15, wherein each textual entry of a data entry comprises an album title, and wherein the method further comprises aggregating one or more data entries having a corresponding album title.

18. The computer storage media of claim 17, wherein the textual entry of each metadata record comprises an album title, and wherein the method further comprises determining whether the album title of a data entry corresponds to an album title of a metadata record; and if so, aggregating the corresponding data entry and metadata record.

19. The computer storage media of claim 15, wherein each textual entry of a data entry comprises an artist entry, and wherein the method further comprises aggregating one or more data entries having a corresponding artist entry.

20. The computer storage media of claim 19, wherein the textual entry of each metadata record comprises an artist entry, and wherein the method further comprises determining whether the artist entry of a data entry corresponds to an artist entry of a metadata record; and if so, aggregating the corresponding data entry and metadata record.

\* \* \* \* \*